(12) United States Patent
Aro et al.

(10) Patent No.: US 7,525,731 B2
(45) Date of Patent: Apr. 28, 2009

(54) ANTIGLARE LIGHT DIFFUSING MEMBER

(75) Inventors: Jun Aro, Tokyo (JP); Hisamitsu Kameshima, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 11/805,435

(22) Filed: May 22, 2007

(65) Prior Publication Data

US 2008/0112055 A1    May 15, 2008

(30) Foreign Application Priority Data

Nov. 15, 2006    (JP)    ............................... 2006-308875

(51) Int. Cl.
  *G02B 13/20* (2006.01)
  *G02B 5/02* (2006.01)
(52) U.S. Cl. ........................ 359/599; 359/707; 428/1.3
(58) Field of Classification Search ................. 359/599, 359/707, 601–614
  See application file for complete search history.

(56) References Cited

U.S. PATENT DOCUMENTS

| | | | |
|---|---|---|---|
| 5,387,463 A | 2/1995 | Nakamura et al. | |
| 6,111,699 A | 8/2000 | Iwata et al. | |
| 6,217,176 B1 | 4/2001 | Maekawa | |
| 6,343,865 B1 | 2/2002 | Suzuki | |
| 6,480,249 B2 | 11/2002 | Iwata et al. | |
| 6,572,961 B1 * | 6/2003 | Koyama et al. | ............. 428/323 |
| 6,696,140 B2 | 2/2004 | Suzuki | |
| 6,710,923 B2 * | 3/2004 | Ito | ............................. 359/599 |
| 6,896,960 B2 | 5/2005 | Shoshi et al. | |
| 7,033,638 B2 | 4/2006 | Suzuki | |
| 7,283,304 B2 * | 10/2007 | Murata et al. | ............... 359/599 |
| 2002/0150722 A1 | 10/2002 | Suzuki | |
| 2004/0071986 A1 | 4/2004 | Shoshi et al. | |
| 2004/0150874 A1 | 8/2004 | Suzuki | |
| 2006/0159902 A1 | 7/2006 | Suzuki | |
| 2008/0030861 A1 * | 2/2008 | Ookubo et al. | ............... 359/601 |

FOREIGN PATENT DOCUMENTS

| | | |
|---|---|---|
| JP | 11-160505 | 6/1999 |
| JP | 11-305010 | 11/1999 |
| JP | 11-326608 | 11/1999 |
| JP | 2000-180611 | 6/2000 |
| JP | 2000-338310 | 12/2000 |

(Continued)

*Primary Examiner*—Thong Nguyen
(74) *Attorney, Agent, or Firm*—Squire, Sanders & Dempsey, L.L.P.

(57) ABSTRACT

An antiglare light diffusing member is provided comprising a transparent base material and an antiglare light diffusing layer including a binder matrix, a plurality of particles (A) and a plurality of particles (B). A front surface of the antiglare light diffusing layer should not be flat. The difference between a refractive index of the plurality of particles (A) and a refractive index of the binder matrix can be less than or equal to 0.02. The difference between a refractive index of the plurality of particles (B) and a refractive index of the binder matrix can be 0.03-0.2. An average particle diameter of the plurality of particles (A) can be bigger than an average film thickness of the antiglare light diffusing layer. An average particle diameter of the plurality of particles (B) is smaller than an average film thickness of the antiglare light diffusing layer.

7 Claims, 3 Drawing Sheets

FOREIGN PATENT DOCUMENTS

| | | |
|---|---|---|
| JP | 2003-004903 | 1/2003 |
| JP | 2003-149413 | 5/2003 |
| JP | 2003-260748 | 9/2003 |
| JP | 2004-004777 | 1/2004 |
| JP | 2004-082613 | 3/2004 |
| JP | 2004-125958 | 4/2004 |

* cited by examiner

ANTIGLARE LIGHT DIFFUSING MEMBER

CROSS REFERENCE

This application claims priority to Japanese application number 2006-308875, filed on Nov. 15, 2006, which is incorporated by reference.

BACKGROUND OF THE INVENTION

1. Field of the Invention

The present invention relates to an antiglare light diffusing member to be provided on the surface of a window, display etc. In particular, it relates to an antiglare light diffusing member to be provided on the surface of such displays as a liquid crystal display (LCD), cathode-ray tube (CRT) display, plasma display (PDP), organic electroluminescence display (ELD) and field effect display (FED, SED).

2. Description of the Related Art

Displays such as a liquid crystal display, CRT display, EL display and plasma display have some problems described below from the viewpoint of visibility:
 External light reflects at looking and listening.
 Surface glare (scintillation) occurs at the display surface by display light from the display.
 Visibility is not good caused by dazzle of display light directly coming from the display without being diffused, etc.
 Visibility is also degraded by such defect as unevenness of brightness.

In order to solve such lowering or degradation of visibility, it is known to arrange an antiglare light diffusing member on the front face of a display.

As an antiglare light diffusing member, for example, following techniques are known:
 To arrange, on the surface of a display, an antiglare light diffusing member having an antiglare light diffusing layer having been subjected to embossing finish.
 To arrange, on the surface of a display, an antiglare light diffusing member having an antiglare light diffusing layer on the surface of which is formed irregularity by mixing particles in a binder matrix.

In such antiglare light diffusing member, scattering phenomenon (surface diffusion) of light caused by surface irregularity is utilized.

Further, such antiglare light diffusing member is also known that, by mixing particles having a refraction index different from that of a binder matrix into the binder matrix, utilizes internal scattering (internal diffusion) of light based on the difference in refraction indices of the binder matrix and particles.

In an antiglare light diffusing member on the surface of which is formed irregularity through embossing finish, the surface irregularity thereof can be completely controlled. Consequently, reproducibility is good. However, when there is a defect or an adhered foreign substance on an emboss roll, endless defects occur at the pitch of roll. Consequently, in the case of mass production, all the products have defect. Further, since the scattering only at the surface is utilized, there are following problems:
 Abrasion resistance
 Lowering of contrast
 Occurrence of dazzle An antiglare light diffusing member using a binder matrix and particles can be manufactured through a smaller number of processes than the antiglare light diffusing member using embossing finish. Accordingly, it can be manufactured inexpensively. Therefore, various embodiments of antiglare light diffusing member are known (Patent Document 1).

For example, following antiglare light diffusing members are known.

It is necessary to improve visibility by preventing reflection of external light, scintillation etc. Therefore, following methods have been considered:
 To improve light diffusing performance by making irregularity figure of the surface large.
 To improve light diffusing performance by increasing the amount of particles to be added.

However, there is such problem in the methods that the sharpness of a transmitted image is lowered.

As methods for improving the visibility etc. without lowering light diffusing performance and the like, following techniques are known:
 A technique in which binder matrix resin, spherical particles and amorphous particles are used in combination (Patent Document 2).
 A technique in which binder matrix resin and plural particles having different particle sizes are used (Patent Document 3).
 A technique including surface irregularity, wherein the cross-sectional area of the concave portion is defined (Patent Document 4).

In addition, in order to improve the visibility without lowering light diffusing performance etc., there is also known such technique that uses scattering in an antiglare light diffusing member and scattering at the surface of antiglare light diffusing member in combination.

The scattering within an antiglare light diffusing member (internal diffusion) occurs by dispersing particles in a binder matrix such as resin of an antiglare light diffusing member, the particles having refraction index different from that of the binder matrix. In order to exert sufficient light diffusing performance, it is necessary to form a certain degree of surface irregularity on the surface of antiglare light diffusing member. However, there are following problems:
 Lowering of contrast
 Occurrence of dazzle caused by lens effect of the surface irregularity
 Lowering of abrasion resistance The combined use of internal scattering and surface scattering leads to smaller surface irregularity compared with an antiglare light diffusing member using surface scattering alone. Therefore, there are following advantages:
 Improvement of contrast
 Reduction of dazzle caused by lens effect of the surface irregularity
 Improvement of abrasion resistance For example, as the technique using internal scattering and surface scattering in combination, following techniques are known.
 A technique wherein the internal haze (cloudiness) is 1-15%, and the surface haze (cloudiness) is 7-30% (Patent Documents 5, 6).
 A technique wherein, while using a binder resin and particles having the particle size of 0.5-5 μm, the difference in refraction indices of the resin and the particle is 0.02-0.2 (Patent Document 7).
 A technique wherein, while using a binder resin and particles having the particle size of 1-5 μm, the difference in refraction indices of the resin and the particle is 0.05-0.15. Further, techniques defining a solvent to be used, surface roughness etc. (Patent Documents 8, 9, 10, 11, 12).

A technique wherein, using binder resin and plural types of particles, the difference in refraction indices of the resin and the particle is 0.03-0.2 (Patent Documents 13, 14).

There are also known following techniques that reduce lowering of contrast, hue variation etc. when a viewing angle is altered. In the technique, the surface haze (cloudiness) is 3 or more. Further, the difference between the haze value in the direction of normal line and the haze value in the direction of ±60° is 4 or less (Patent Documents 15, 16, 17, 18). A technique wherein center line average roughness (Ra) is 0.2 µm or less is also known (Patent Document 19). A technique wherein the center line average roughness (Ra) is 0.02-1 µm, and the ten point average roughness (Rz)/Ra is 30 or less is also known (Patent Document 20, 21).

Since an antiglare light diffusing member is mainly arranged on the front face of a display, abrasion resistance is required. In order to improve the abrasion resistance, it is necessary to improve the hardness of an antiglare light diffusing member. Therefore, there is known such technique as using an ionizing radiation-curing resin binder, silica particles and silicone particles in order to manufacture an antiglare light diffusing member having a high hardness without lowering the display image quality of a display (Patent Document 21).

As described above, there are disclosed antiglare light diffusing members of various constitutions for various purposes.

The performance required for an antiglare light diffusing member differs depending on displays when it is used on the front face of a display. For example, the optimum antiglare light diffusing member differs depending on the resolving power of a display, intended purpose etc. A broad range of antiglare light diffusing members are required according to intended purposes.

As for an antiglare light diffusing member, properties such as surface haze value mainly showing degree of surface diffusion, internal haze value mainly showing internal diffusion, image visibility and degree of brilliance are generally important. In addition, in a case where an antiglare light diffusing member is used in a front surface of a display, properties such as hardness are also important. Further, suitability for coating at the time of manufacturing, cost and curl should be considered. Therefore, many factors are limited. It is difficult to control surface haze, internal haze and the like because many factors are limited.

As for an antiglare light diffusing member including a binder matrix and one kind of particle, one kind of particle affect surface haze and internal haze. Therefore it is difficult to achieve a desired surface haze and internal haze. For example, in a case where surface haze is lowered while internal haze is not changed, it is impossible to control the haze by changing an amount of added particles. That is, designing of kind, particle diameter, an added amount and the like of an adopted particle is necessary to be done again.

In addition, in the following case where a plurality of kind of particles are used, it is also difficult to achieve a desired surface haze and internal haze:
- a plural kind of particles of which refractive index are identical and particle diameters are different from each other are used.
- refractive indexes of all particles are different from a refractive index of a resin to some extent.

The invention was accomplished while taking this problem into consideration, and aims to provide an antiglare light diffusing member of which surface diffusion and internal diffusion of incident light can be easily controlled when it is used for a display.

[Patent Document 1] U.S. Pat. No. 5,387,463
[Patent Document 2] JP-A-2003-260748
[Patent Document 3] JP-A-2004-004777
[Patent Document 4] JP-A-2003-004903
[Patent Document 5] Japanese Patent No. 3507719
[Patent Document 6] U.S. Pat. No. 6,343,865
[Patent Document 7] JP-A-11-326608
[Patent Document 8] Japanese Patent No. 3515426
[Patent Document 9] U.S. Pat. No. 6,696,140
[Patent Document 10] U.S. Pat. No. 7,033,638
[Patent Document 11] US Patent Published Application No. 2002-0150722
[Patent Document 12] US Patent Published Application No. 2004-0150874
[Patent Document 13] Japanese Patent No. 3515401
[Patent Document 14] U.S. Pat. No. 6,217,176
[Patent Document 15] JP-A-11-160505
[Patent Document 16] U.S. Pat. No. 6,111,699
[Patent Document 17] U.S. Pat. No. 6,327,088
[Patent Document 18] U.S. Pat. No. 6,480,249
[Patent Document 19] JP-A-2003-149413
[Patent Document 20] JP-A-2004-125958
[Patent Document 21] JP-A-2004-082613
[Patent Document 22] US Patent Published Application No. 2004-0071986

SUMMARY OF THE INVENTION

One embodiment of the present invention is disclosed below. An antiglare light diffusing member is disclosed comprising a transparent base material and an antiglare light diffusing layer including a binder matrix, a plurality of first particles (A) and a plurality of second particles (B), wherein a front surface of the antiglare light diffusing layer is not flat, wherein difference between a refractive index of the plurality of first particles (A) and a refractive index of the binder matrix is less than or equal to 0.02, wherein difference between a refractive index of the plurality of second particles (B) and a refractive index of the binder matrix is 0.03-0.2, wherein an average particle diameter of the plurality of first particles (A) is bigger than an average film thickness of the antiglare light diffusing layer, and wherein an average particle diameter of the plurality of second particles (B) is smaller than an average film thickness of the antiglare light diffusing layer.

BRIEF DESCRIPTION OF DRAWINGS

FIGS. 3(a) and (b) are cross-sectional views showing transmission type liquid crystal displays with the use of antiglare light diffusing members of embodiments of the present invention.

| [Description of Reference Numerals] | |
|---|---|
| 1 | antiglare light diffusing member |
| 11 | transparent base material |
| 12 | antiglare light diffusing layer |
| 120 | binder matrix |
| 12A | first particle (A) |
| 12B | second particle (B) |
| $h_a$ | (average) particle diameter of first particles (A) |
| $h_b$ | (average) particle diameter of second particles (B) |
| H | average film thickness of antiglare light diffusing layer |

-continued

[Description of Reference Numerals]

| | |
|---|---|
| 13 | reflection preventing layer |
| 2 | polarization plate |
| 21 | transparent base material |
| 22 | transparent base material |
| 23 | polarization layer |
| 3 | liquid crystal cell |
| 4 | polarization plate |
| 41 | transparent base material |
| 42 | transparent base material |
| 43 | polarization layer |
| 5 | backlight unit |
| 7 | polarization plate unit |

DESCRIPTION OF THE PREFERRED EMBODIMENTS

An antiglare light diffusing member is described below.

Figure 1:
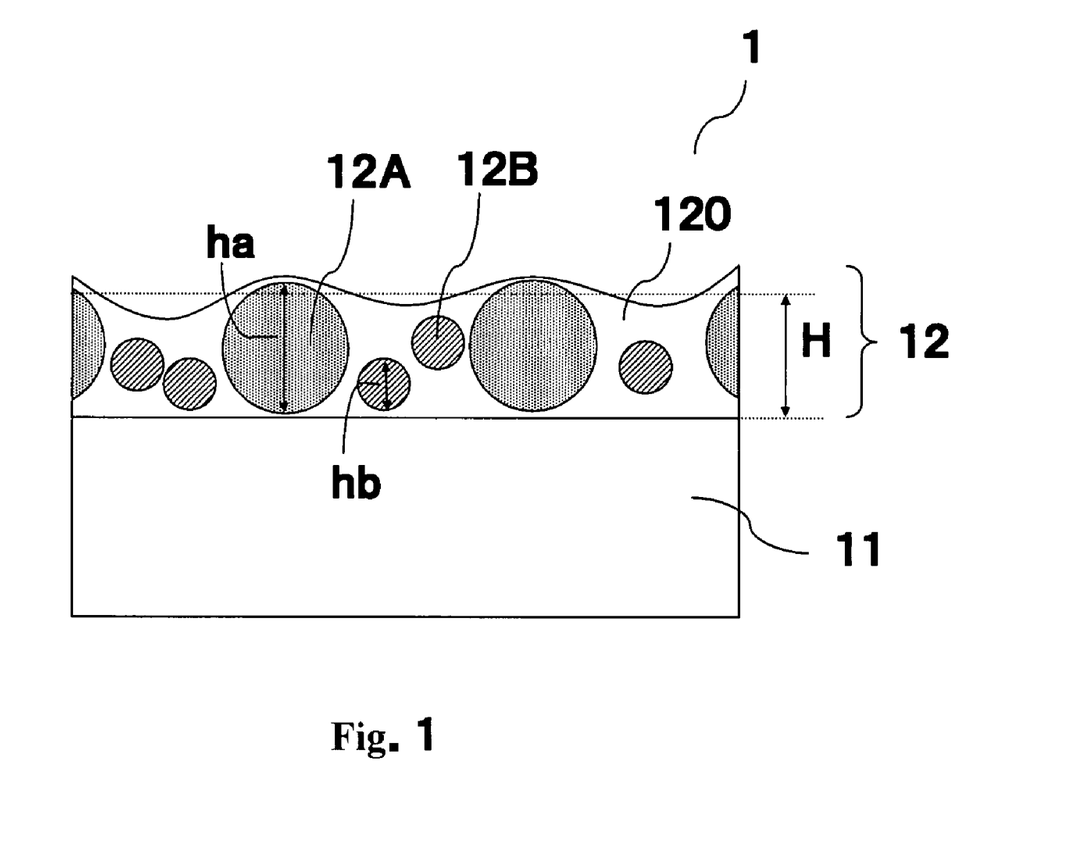
FIG. 1 is a cross-sectional view showing an antiglare light diffusing member of an embodiment of the present invention.

FIG. 1 shows a cross-section view of an antiglare light diffusing member of an embodiment of the present invention.

An antiglare light diffusing member (1) has an antiglare light diffusing layer (12) on a transparent base material (11). An antiglare light diffusing layer provided on a transparent base material includes a binder matrix (120), first particles (A) (12A) and second particles (B) (12B). Difference between a refractive index of first particles (A) and a refractive index of a binder matrix is less than or equal to 0.02. An average particle diameter ($h_a$) of the first particles (A) is bigger than an average film thickness (H) of the antiglare light diffusing layer. Difference between a refractive index of second particles (B) and a refractive index of a binder matrix is 0.03-0.20. An average particle diameter ($h_b$) of the second particles (B) is smaller than 0.9 times of an average film thickness (H) of the antiglare light diffusing layer.

In an antiglare light diffusing member, scattering of an incident light into an antiglare light diffusing layer consists of two types of diffusion of surface diffusion caused by surface irregularity and internal diffusion caused by the difference between a refractive index of internal particles and a refractive index of a binder matrix.

In the embodiment of the present invention, since an average particle diameter of first particles (A) is bigger than an average film thickness of the antiglare light diffusing layer, the antiglare light diffusing layer has an irregular surface and incident light into a surface of an antiglare light diffusing layer can be scattered by surface irregularity. That is, second particles (B) contribute to internal diffusion in an antiglare light diffusing layer.

On the other hand, since a refractive index of first particles (A) is near a refractive index of a binder matrix, first particles (A) little contributes to internal diffusion of incident light into inside of an antiglare light diffusing layer. In addition, since an average particle diameter of second particles (B) is smaller than 0.9 times of an average film thickness of the antiglare light diffusing layer, second particles (B) do not cause irregularity of a surface of an antiglare light diffusing layer and little contribute to surface diffusion of incident light into a front surface of an antiglare light diffusing layer.

First particles (A) and second particles (B) can separately contribute to light diffusing performance of an antiglare light diffusing layer. First particles (A) mainly contribute to surface diffusion performance of an antiglare light diffusing layer and second particles (B) contribute to internal diffusion performance of an antiglare light diffusing layer. That is, as for an antiglare light diffusing member of the present invention, surface diffusion performance and internal diffusion performance of an antiglare light diffusing layer can be controlled individually. Surface diffusion performance and internal diffusion performance of an antiglare light diffusing layer of an antiglare light diffusing member are important factors in controlling reflection property of external light (antiglare property) and the like. That is, in the present invention, a desired antiglare light diffusing member can be easily manufactured by controlling surface diffusion performance and internal diffusion performance of an antiglare light diffusing layer individually.

A refractive index of a binder matrix in the present invention means a refractive index of a film after the film is formed by using a binder matrix.

In the embodiment of the present invention, an average particle diameter of first particles (A) is bigger than an average film thickness of an antiglare light diffusing layer. Further, it is desirable that an average particle diameter of first particles (A) is bigger than an average film thickness of an antiglare light diffusing layer and is smaller than 1.4 times of an average film thickness of an antiglare light diffusing layer. In a case where an average particle diameter of first particles (A) is smaller than an average film thickness of an antiglare light diffusing layer, first particles (A) can not contribute to effectively forming an irregular surface of an antiglare light diffusing layer and a large amount of first particles (A) is necessary to form irregular surface of an antiglare light diffusing layer. That is, in a case where an average particle diameter of first particles (A) is smaller than an average film thickness of an antiglare light diffusing layer, first particles (A) can not effectively contribute to surface diffusion of incident light into a surface of an antiglare light diffusing layer. In addition, in a case where an average particle diameter of first particles (A) is bigger than 1.4 times of an average film thickness of an antiglare light diffusing layer, first particles (A) formed in a surface of an antiglare light diffusing layer easily drops off. Further, it is desirable that an average particle diameter of first particles (A) is bigger than an average film thickness of an antiglare light diffusing layer and is smaller than 1.2 times of an average film thickness of an antiglare light diffusing layer.

In the present invention, difference between a refractive index of first particles (A) and a refractive index of a binder matrix is less than or equal to 0.02. In a case where the difference is over 0.02, first particles (A) tend to contribute to not only surface diffusion but also internal diffusion.

In the embodiment of the present invention, an average particle diameter of second particles (B) is smaller than 0.9 times of an average film thickness of an antiglare light diffusing layer. In a case where an average particle diameter of—second particles (B) is bigger than or equal to 0.9 times of an average film thickness of an antiglare light diffusing layer, second particles (B) tend to contribute to not only internal diffusion of incident light into a surface of an antiglare light diffusing layer but also surface diffusion. Further, it is desirable that an average particle diameter of second particles (B) is smaller than 0.8 times of an average film thickness of an antiglare light diffusing layer. In addition, the smaller the second particle (B) is, the less the second particle (B) contributes to surface diffusion of incident light into a surface of an antiglare light diffusing layer. Therefore, much smaller particle (B) is preferable. However, the smaller the second particle (B) is, the higher the cost is. Therefore, it is necessary to select a desired size of a second particle (B). In addition, in a case where an average particle diameter of second particles (B) is smaller than a wave length of visible light, second particles (B) do not scatter incident light. Therefore, an average particle diameter of second particles (B) should be bigger than or equal to a wave length of visible light.

In the present invention, difference between a refractive index of second particles (B) and a refractive index of a binder matrix is 0.03-0.20. More preferably, the difference is 0.05-0.08. In a case where the difference is less than 0.03, internal diffusion is insufficient. In addition, in a case where the difference is more than 0.20, an antiglare light diffusing layer tends to be whitened.

In addition, it is desirable that a refractive index of second particles (B) is higher than a refractive index of a binder matrix by 0.03-0.20. In a case where a refractive index of second particles (B) is lower than a refractive index of a binder matrix, light emitted from inside of a display tends to reflect totally at an interface between a second particle (B) and a binder matrix. As a result, it is possible that an amount of light at front a surface of a display decreases.

In addition, in the present invention, in a case where a content of first particles (A) in an antiglare light diffusing layer is 1.0-4.5 wt % and a content of second particles (B) in an antiglare light diffusing layer is 0.5-4.0 wt %, an antiglare light diffusing member having texture like a clear film with superior contrast, the external light reflection preventiveness and no surface irregularity can be obtained. In the present invention, although the contents of the particles are too low, that is, a content of first particles (A) in an antiglare light diffusing layer is 1.0-4.5 wt % and a content of second particles (B) in an antiglare light diffusing layer is 0.5-4.0 wt %, first particles (A) can effectively contribute to surface diffusion of incident light into an antiglare light diffusing layer, second particles (B) can effectively contribute to internal diffusion of incident light into an antiglare light diffusing layer and an antiglare light diffusing member having texture like a clear film with no surface irregularity can be obtained.

In addition, in the present invention, an average file thickness of an antiglare light diffusing layer means an average value of a film thickness of an antiglare light diffusing layer having surface irregularity. An average film thickness can be measured by using an electronic micrometer or a full automatic detailed configuration measurement machine. The refractive index can be measured according to the Becke line-detecting method (immersion method).

In addition, in the present invention, a value measured by a light scattering method can be used as an average particle size. The light scattering method will be described below. A sample liquid containing particles is prepared. The sample liquid is measured with a particle size distribution measuring apparatus of a light scattering system. The sample liquid containing particles is prepared so that no aggregation occurs. For the purpose, suitably, the sample liquid is diluted by a diluent in accordance with the type etc. of particles.

In addition, in the present invention, an average film thickness of the antiglare light diffusing layer should be 2 μm-25 μm. When an average film thickness of the antiglare light diffusing layer is smaller than 2 μm, it is possible that whitening occurs. When an average film thickness of the antiglare light diffusing layer is over 25 μm, the cost is too high. More preferably, it is 3 μm-12 μm.

The antiglare light diffusing layer preferably has a surface hardness of 3 H or more in the pencil hardness according to JIS K5400. More preferably it has 4 H or more, because an antiglare light diffusing layer provided on a surface of a display can have sufficient abrasion-resistance.

In addition, in an antiglare light diffusing member, to the binder matrix, other functional additives may be added. But, other functional additives must not affect transparency, light diffuseness etc. Examples of the usable functional additive include an antistatic agent, an ultraviolet absorber, an infrared absorber, a refraction index-adjusting agent, an antifouling agent, a water repellent agent, an adhesiveness-improving agent and a curing agent. An antiglare light diffusing layer can have functions such as an antistatic function, an ultraviolet absorbing function, an infrared absorbing function, an antifouling function and a water repellent function besides an antiglare function.

In addition, an antiglare light diffusing member can have a functional layer having a performance such as reflection preventing performance, antistatic performance, antifouling performance, electromagnetic shield performance, infrared absorbing performance, ultraviolet absorbing performance and color correcting performance. Examples of these functional layers include a reflection preventing layer, an antistatic layer, an antifouling layer, an electromagnetic shield layer, an infrared absorbing layer, an ultraviolet absorbing layer, a color correcting layer and the like. In addition, these functional layers may consist of one layer or a plurality of layers. One embodiment of the functional layer is that a functional layer consisting of one layer has a plurality of functions. For example, a reflection preventing layer having antifouling performance can be adopted. In addition, to improve adhesion property between a transparent base material and an antiglare light diffusing layer or between some kinds of layers, a primer layer, an adhesion layer and the like can be provided between some layers.

Figure 2:
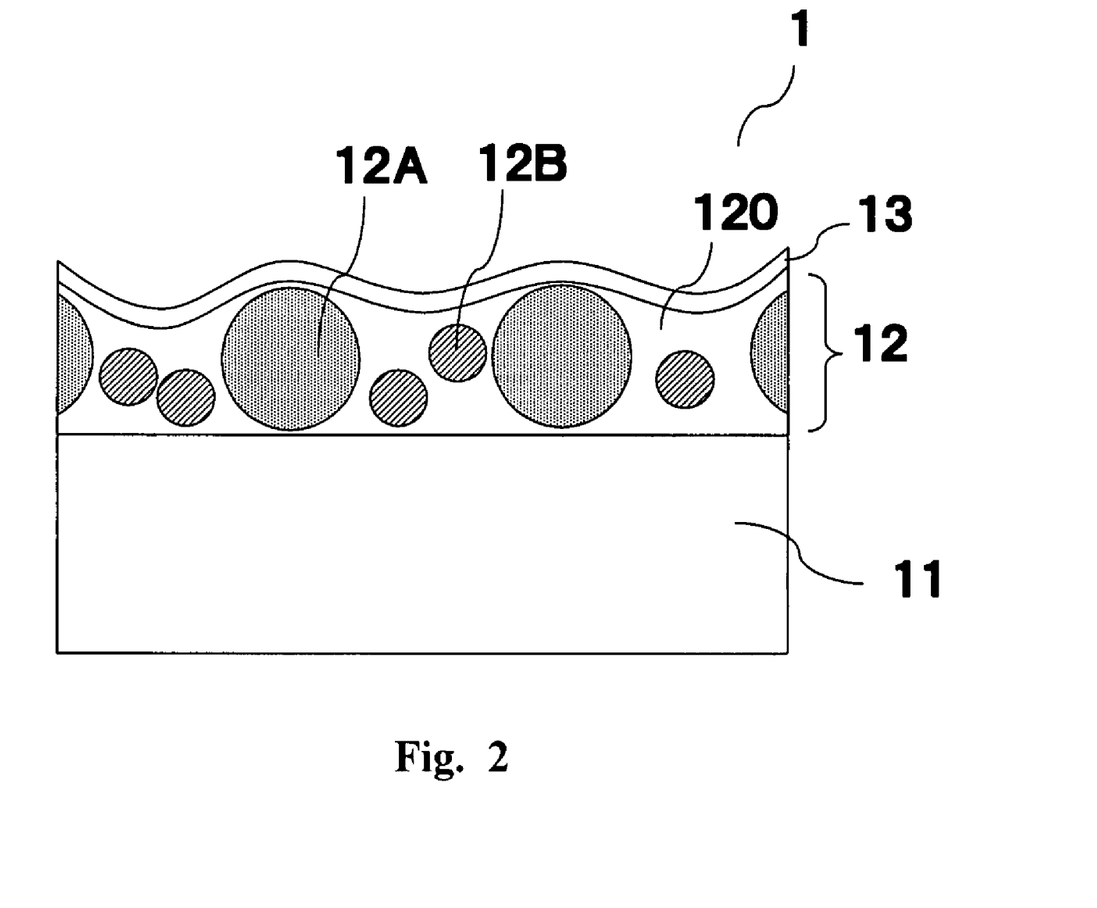
FIG. 2 is a cross-sectional view showing another embodiment of an antiglare light diffusing member of the present invention.

FIG. 2 is a cross-section view showing another embodiment of an antiglare light diffusing member of the present invention. In FIG. 2, as for an antiglare light diffusing member (1), an antiglare light diffusing layer (12) is provided on a transparent base material (11), and further a reflection preventing layer (13) is provided on an antiglare light diffusing layer (12). In addition, a reflection preventing layer (13) may consist of single layer of low refractive index layer or may consist of a plurality of layers which a low refractive index layer and a high refractive index layer are repeated.

An antiglare light diffusing member of the present invention can be used for a surface at a observer side of various displays such as a liquid crystal display (LCD), a CRT display, an organic electroluminescence display (ELD), a plasma display (PDP), surface-conduction electron-emitter display (SED), Field Emission Display (FED). The present invention provides an antiglare light diffusing member which is superior in reflection preventing of external light and is superior in contrast in a case where the member is used for a display.

Figure 3:
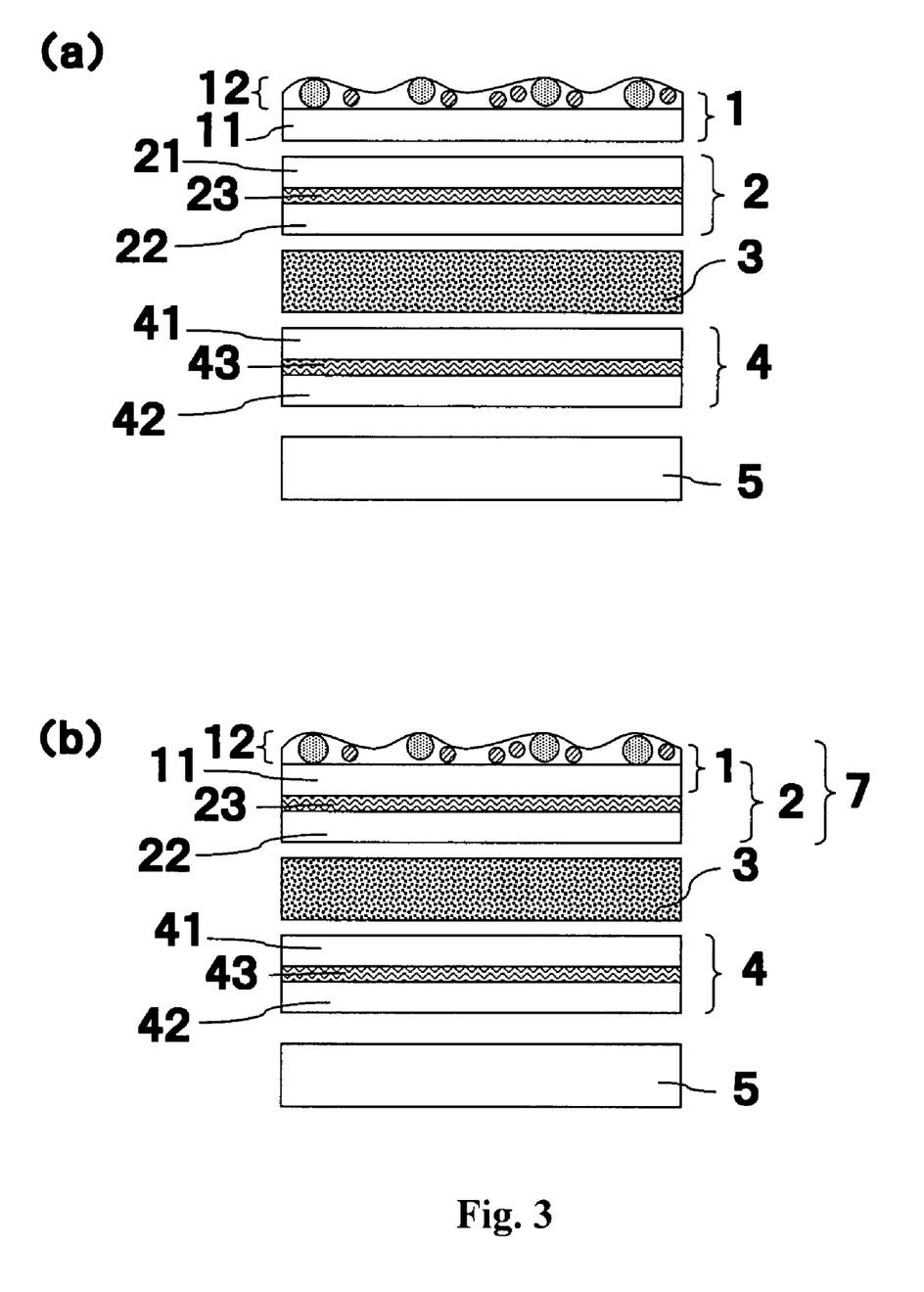

FIG. 3 is a cross-sectional view showing a transmission type liquid crystal display with the use of an antiglare light diffusing member of the present invention. A transmission type liquid crystal display shown in FIG. 3(a) has a backlight unit (5), a polarization plate (4), a liquid crystal cell (3), a polarization plate (2) and an antiglare light diffusing member (1) in this order. In this embodiment, an antiglare light diffusing member (1) side is an observer side, that is, a front surface of a display.

A backlight unit (5) comprises a light source and a light diffusing plate. As for a liquid crystal cell, an electrode is provided on a transparent base material in one side, an electrode and a color filter are provided on a transparent base material in another side and a liquid crystal is encapsulated between both of the electrodes. As for polarization plates sandwiching a liquid crystal cell (3), polarization layers (23, 43) are between transparent base materials (21, 22, 41 and 42).

A transmission type liquid crystal display shown in FIG. 3(b) has a backlight unit (5), a polarization plate (4), a liquid crystal cell (3) and a polarization plate unit (7) which a polarization plate (2) combines with an antiglare light diffusing member (1), in this order.

As for an antiglare light diffusing member used for a liquid crystal display, as shown in FIG. 3(b), a polarization layer (23) can be provided on a surface of a transparent base material (11) opposite to a surface where an antiglare light diffusing layer (12) is formed, and the transparent base material (11) can be used as a polarization plate.

Next, a manufacturing method of an antiglare layer of the present invention is described below.

As the base material for use in the antiglare light diffusing member of the invention, glass, a plastic film etc. can be used. It suffices that the plastic film has a proper degree of transparency and mechanical strength. For example, such films as polyethylene terephthalate (PET), triacetylcellulose (TAC), diacetylcellulose, acetylcellulose butyrate, polyethylene naphthalate (PEN), cycloolefine polymer, polyimide, polyether sulfone (PES), polymethyl methacrylate (PMMA) and polycarbonate (PC) can be used.

When the antiglare light diffusing member is used on the front face of a liquid crystal display etc., triacetylcellulose (TAC) is used preferably because it does not show optical anisotropy.

Further, a polarizing plate may be used as the base material. There is no particular limitation on a polarizing plate to be used. For example, such polarizing plate can be used that has a stretched polyvinyl alcohol (PVA) added with iodine as a polarizing layer between a pair of triacetylcellulose (TAC) films which are supporting bodies of a polarizing layer. A polarizing plate composed of a TAC film and a stretched PVA added with iodine has a high polarization degree and can be used suitably for a liquid crystal display etc. In this case, an antiglare light diffusing layer can be provided on one of triacetylcellulose (TAC) films.

In addition, as for a transparent base material for the present invention, from the viewpoint of optical property, mechanical strength, handleability etc., the thickness of the base material is preferably 10-500 μm.

To the base material, an additive may be added. Examples of the additive include an ultraviolet absorber, infrared absorber, antistatic agent, refraction index-adjusting agent and reinforcing agent.

For the binder matrix for use in the antiglare light diffusing layer, following properties are required:

When a film is formed using the binder matrix, the film has proper degree of transparency and mechanical strength.

Added particles are dispersed in the binder matrix.

For example, ionizing radiation-curable resin such as ultraviolet ray-curable resin and electron beam-curable resin, heat-curable resin, thermoplastic resin, and an inorganic or organic-inorganic composite matrix obtained by hydrolyzing and dehydration-condensing metal alkoxide can be used.

Examples of the heat-curable resin include heat curable type urethane resin composed of acrylic polyol and isocyanate prepolymer, phenol resin, urea-melamine resin, epoxy resin, unsaturated polyester resin and silicone resin.

Examples of the ionizing radiation-curable resin include polyfunctional acrylate resin such as acrylic or methacrylic ester of polyhydric alcohol, and polyfunctional urethane acrylate resin synthesized from diisocyanate, polyhydric alcohol and hydroxyl ester of acrylic acid or methacrylic acid. In addition to these, polyether resin having an acrylate-based functional group, polyester resin, epoxy resin, alkyd resin, spiroacetal resin, polybutadiene resin, polythiolpolyene resin can be also used.

Among the ionizing radiation-curable resin, when ultraviolet ray-curable resin is used, a photopolymerization initiator is added. Any photopolymerization initiator may be usable, but the use of one suitable for a resin to be used is preferred.

As the photopolymerization initiator (radical polymerization initiator), benzoin and alkyl ethers thereof such as benzoin, benzoinmethylether, benzoinethylether, benzoinisopropylether and benzylmethylketal are used. The use amount of the photosensitizing agent is 0.5-20 wt %, preferably 1-5 wt % relative to the resin.

Examples of the usable thermoplastic resin include cellulose derivatives such as acetylcellulose, nitrocellulose, acetylbutylcellulose, ethylcellulose and methylcellulose, vinyl-based resins such as vinyl acetate and copolymer thereof, vinyl chloride and copolymer thereof and vinylidene chloride and copolymer thereof, acetal resin such as polyvinyl formal and polyvinyl butyral, acrylic resin such as acrylate resin and copolymer thereof and methacrylate resin and copolymer thereof, polystyrene resin, polyamide resin, linear polyester resin and polycarbonate resin.

Examples of the usable inorganic or organic-inorganic composite matrix include materials using silicon oxide-based matrix employing a silicon alcoxide-based material as a starting material. For example, tetraethoxysilane can be used.

When the base material is made of a plastic film, in order to supply mechanical strength, a binder matrix having a high hardness is preferably used. Specifically, resin having a high hardness, and inorganic or organic-inorganic composite matrix obtained by hydrolyzing and dehydration-condensing metal alkoxide can be used. In particular, when using a plastic film having a thickness of 100 μm or less, the use of a binder matrix having a high hardness is preferred.

Especially, the use of an ionizing radiation-curable resin such as an ultraviolet ray-curable resin and an electron beam-curable resin for a binder matrix of an antiglare light diffusing member of the present invention is preferable. The use of ionizing radiation-curable resin makes it possible to manufacture an antiglare light diffusing layer having a certain degree of flexibility, no crack and high hardness which surface hardness is, for example, beyond 3 H.

As mentioned above, a refractive index of a binder matrix for the present invention means a refractive index of a film after the film is formed by using a binder matrix. That is, in a case where a curable resin is used, a refractive index of a binder matrix means a refractive index of a film after the film is formed by curing the curable resin. A refractive index of a binder matrix is a measured value by using a binder matrix without particles for measurement.

In the embodiment of the present invention, two types of particles are included. That is, an antiglare light diffusing layer includes at least two types of particles of first particles (A) and second particles (B). The first particles (A) are added to create the surface diffusion. The second particles (B) are added to create the internal diffusion. Different types of particles create the surface diffusion and the internal diffusion respectively. Therefore, surface haze and internal haze due to surface diffusion and internal diffusion can be easily controlled by controlling the amounts of each different particle added to an antiglare light diffusing layer.

First particles (A) and second particles (B) used for an antiglare light diffusing layer can be selected from silica particle (refractive index 1.46), acryl particle (refractive index 1.49), acryl-styrene particle (refractive index 1.49-1.59), talc (refractive index 1.54), various aluminosilicate (refractive index 1.50-1.60), kaolin clay (refractive index 1.53), MgAl hydrotalcite (refractive index 1.50), styrene particle (refractive index 1.59), acryl styrene particle (refractive index 1.58), polycarbonate particle (refractive index 1.58), melamine particle (refractive index 1.66) and the like.

In the embodiment of the present invention, difference between a refractive index of first particles (A) and a refractive index of a binder matrix should be less than or equal to 0.02, and an average particle diameter of first particles (A) should be bigger than an average thickness of the antiglare light diffusing layer. Especially, it is desirable that an average particle diameter of first particles (A) is bigger than an average thickness of the antiglare light diffusing layer and is smaller than 1.4 times of an average thickness of the antiglare light diffusing layer.

Further, the use of first particles (A) whose standard deviation of particle size is 40% or less of the average particle size is preferred. The standard deviation can be calculated from the particle size distribution obtained in volume frequency with the particle size distribution measuring apparatus of a light diffusing system.

Further, difference between a refractive index of second particles (B) and a refractive index of a binder matrix should be 0.03-0.20, and an average diameter of second particles (B) should be smaller than an average thickness of the antiglare light diffusing layer. Especially, it is desirable that an average particle diameter of second particles (B) is smaller than 0.9 times of an average thickness of the antiglare light diffusing layer and is bigger than 0.2 times of an average thickness of the antiglare light diffusing layer.

Further, it is desirable that a refractive index of second particles (B) is higher than a refractive index of a binder matrix by 0.03-0.2. In a case where a refractive index of second particles (B) is lower than a refractive index of a binder matrix, light emitted from the inside of a display is easily reflected totally at a interface between the particle and the binder matrix, so, as a result, it is possible that an amount of light at a front surface of a display decreases.

Further, the use of second particles (B), whose standard deviation of the particle size is 15% or less of the average particle size, is preferred. The second particles (B) are further preferably in the monodispersion state. In the case of monodispersion, the lowering of front luminance becomes further small.

The first particles (A) and the second particles (B) preferably have a spherical shape. Especially, the spherical second particle (B) results in a small lowering of front luminance of light emitted from the display caused by the internal diffusion and further results in a small lowering of contrast of display material. In addition, the spherical particle includes a perfect spherical particle and ellipse-sphere, and further, particles formed continuously by spherical surfaces.

In the present invention, the content of the first particles (A) relative to the antiglare light diffusing layer is preferably 1.0-4.5 wt % and the content of the second particles (B) relative to the antiglare light diffusing layer is preferably 0.5-4.0 wt %. In a case where the contents of the first particles (A) and the second particles (B) are within the above mentioned range, an antiglare light diffusing member having low dazzle and high contrast can be obtained. That is, since first particles (A) effectively contributes to surface diffusion of light emitted into an antiglare light diffusing layer and second particles (B) effectively contribute to internal diffusion of light emitted into an antiglare light diffusing layer, an antiglare light diffusing member having low dazzle and high contrast can be obtained.

An antiglare light diffusing layer can be obtained by the following processes: a coating liquid including a starting material of a binder matrix, first particles (A) and second particles (B) is applied to a base material; and this coating liquid on a base material is dried or cured.

The coating liquid may contain a solvent according to need.

The solvent must be able to disperse the starting material of the binder matrix, the first particles (A) and the second particles (B). Further, the solvent is required to be provided with coating aptitude. For example, toluene, cyclohexanone, acetone, ketone, ethylcellosolve, ethylacetate, butylacetate, methyl isobutyl ketone, isopropanol methyl ethyl ketone, cyclohexanone, tetrahydrofuran, nitromethane, 1,4-dioxan, dioxolane, N-methylpyrrolidone, ethyl acetate, methyl acetate, dichloromethane, trichloromethane, trichloroethylene, ethylene chloride, trichloroethane, tetra chloroethane, N,N-dimethylformamide and chloroform can be used. In addition a combined solvent thereof can be used.

The amount of the solvent is not particularly limited.

In addition, a solvent which can dissolve a base material can be used. By the use of such a solvent, adhering strength between a base material and an antiglare light diffusing layer can be increased. The use of a combined solvent including a solvent which can dissolve a base material and a solvent which can not dissolve a base material is more preferable.

A coating method using a roll coater, a reverse roll coater, a gravure coater, a knife coater, a bar coater or a slot die coater can be used.

The solid content concentration of the coating liquid differs depending on a coating method. The solid content concentration may be around 30-70 wt % in weight ratio.

A case where a curable resin is used as a binder matrix and an antiglare layer is formed will be described. The above-described coating liquid is coated on the base material. Then, by applying external energy such as ultraviolet rays, electron beams or heat to the coated layer, the coated layer is cured. Thus, the antiglare light diffusing layer is formed.

In the case of ultraviolet curing, such light source as a high-pressure mercury lamp, a low-pressure mercury lamp, an ultrahigh-pressure mercury lamp, a metal halide lamp, a carbon arc lamp and a xenon arc lamp can be utilized.

In the case of electron beam curing, electron beams emitted from various types of electron beam accelerators such as of Cockroft-Walton type, Vandegraph type, resonance transformation type, insulated core transformer type, linear type, Dynamitron type and radio-frequency type, can be utilized. The electron beam has an energy of preferably 50-1000 KeV, more preferably 100-300 KeV.

Before and after the curing process, a drying process may be provided. The curing and drying may be effected simultaneously.

Examples of drying means include heating, air blowing and hot air blowing.

A method for forming the antiglare light diffusing layer using a thermoplastic binder matrix will be described below. The coating liquid is coated on the base material. Then, the coated layer is dried. Thus the antiglare light diffusing layer is formed. Examples of drying means include heating, air blowing and hot air blowing.

A method for forming the antiglare light diffusing layer using an inorganic or organic-inorganic composite matrix will be described below. The coating liquid is coated on the base material. Then, by applying external energy such as ultraviolet rays, electron beams or heat, the coated layer is cured. Thus, the antiglare light diffusing layer is formed.

Before and after the curing process, a drying process may be provided. The curing and drying may be effected simultaneously.

Examples of drying means include heating, air blowing and hot air blowing.

When a polarizing plate having a polarizing layer between a pair of supports for the polarizing layer is used as a base material, a method for manufacturing the antiglare light diffusing member will be described below.

First, on a first support for the polarizing layer, the antiglare light diffusing layer is provided by a method similar to the method described above.

Next, on another side of the first support for the polarizing layer, a polarizing layer is provided. When the polarizing plate is composed of a TAC film and stretched PVA film added with iodine, the stretched PVA film added with iodine is laminated while being stretched on the support for the polarizing layer to provide the polarizing layer.

Next, a second support for the polarizing layer is provided on the polarizing layer.

Another method for manufacturing the antiglare light diffusing member will be described below.

First, a polarizing plate having a polarizing layer between a pair of supports for the polarizing layer is prepared. Then, the antiglare light diffusing layer is provided on one of the supports for the polarizing layer.

As mentioned above, an antiglare light diffusing member of the present invention can have a reflection preventing layer, a water repellent layer, an antifouling layer and the like. In addition, to improve adhesion property between a transparent base material and an antiglare light diffusing layer or between some kinds of layers, a primer layer, an adhesion layer and the like can be provided between some layers.

As mentioned above, in an antiglare light diffusing member, to the binder matrix, other functional additives may be added. But, other functional additives should not affect transparency, light diffuseness etc. Examples of the usable functional additive include an antistatic agent, an ultraviolet absorber, an infrared absorber, a refraction index-adjusting agent, an antifouling agent, a water repellent agent, an adhesiveness-improving agent and a curing agent. An antiglare light diffusing layer can have functions such as an antistatic function, an ultraviolet absorbing function, an infrared absorbing function, an antifouling function and a water repellent function besides an antiglare function.

In addition, an antiglare light diffusing member can include a functional layer having reflection preventing performance, antistatic performance, antifouling performance, electromagnetic shield performance, infrared absorbing performance, ultraviolet absorbing performance, color correction performance or the like. And, a primer layer, an adhesion layer and the like can be provided between some layers to improve adhesion property between some kinds of layers.

An embodiment of the present invention can provide an antiglare light diffusing member of which surface haze and internal haze can be controlled within a desired range.

Hereinafter, Examples and Comparative Example are shown.

A measuring method of the refraction index of a binder matrix used in Examples and Comparative Example is described below. A coating liquid similar to that described above was prepared. But, no particle was contained in the coating liquid. The coating liquid was coated, dried and cured according to a method similar to that described above. The refraction index of thus obtained layer was measured. A digital refractometer RX2000 (manufactured by ATAGO CO., LTD.) was used, and the refraction index was measured according to the light refraction critical angle-detecting system.

The refraction index of the particle was measured according to the Becke line-detecting method (immersion method).

Average particle sizes were measured using a particle size distribution measuring apparatus of a light diffusing system (SALD-7000, manufactured by Shimadzu Corporation).

EXAMPLE 1

A triacetylcellulose film (TD-80U, manufactured by Fuji Photo Film Co., LTD.; refraction index 1.49, film thickness 80 μm) was used as a base material. On the base material, an antiglare light diffusing coating liquid having the composition shown in Table 1 was coated with a slot die coater. Then, a solvent included in the coating liquid was evaporated. Then, the antiglare light diffusing layer was cured through ultraviolet irradiation of 400 mJ using a high-pressure mercury lamp under an atmosphere of 0.03% or less of oxygen concentration. The dried antiglare light diffusing layer had a thickness of 4.8 μm. Thus, a sample was prepared.

EXAMPLE 2

An antiglare layer was prepared same as example 1 with the use of an antiglare light diffusing coating liquid having the composition shown in Table 1. The composition of example 2 was different from that of example 1. The dried and cured antiglare light diffusing layer had a thickness of 5.0 μm. Thus, a sample was prepared.

EXAMPLE 3

An antiglare layer was prepared same as example 1 with the use of an antiglare light diffusing coating liquid having the composition shown in Table 1. The composition of example 3 was different from that of example 1. The dried and cured antiglare light diffusing layer had a thickness of 4.8 μm. Thus, a sample was prepared.

EXAMPLE 4

An antiglare layer was prepared same as example 1 with the use of an antiglare light diffusing coating liquid having the composition shown in Table 1. The composition of example 4 was different from that of example 1. The dried and cured antiglare light diffusing layer had a thickness of 5.0 μm. Thus, a sample was prepared.

EXAMPLE 5

An antiglare layer was prepared same as example 1 with the use of an antiglare light diffusing coating liquid having the composition shown in Table 1. The composition of example 5 was different from that of example 1. The dried and cured antiglare light diffusing layer had a thickness of 5.0 μm. Thus, a sample was prepared.

EXAMPLE 6

An antiglare layer was prepared same as example 1 with the use of an antiglare light diffusing coating liquid having the composition shown in Table 1. The composition of example 6 was different from that of example 1. The dried and cured antiglare light diffusing layer had a thickness of 5.2 μm. Thus, a sample was prepared.

COMPARATIVE EXAMPLE

An antiglare layer was prepared same as example 1 with the use of an antiglare light diffusing coating liquid having the composition shown in Table 1, wherein the composition did not include first particles (A) and second particles (B). The dried and cured antiglare light diffusing layer had a thickness of 4.8 μm. Thus, a sample was prepared.

Evaluation Method of Reflection Property of External Light

Respective samples were laminated to respective black plastic plates and, in that state, the reflection of fluorescent light was evaluated visually. The judgment standard is shown below.

◎: reflection is indistinctive
○: reflection is recognized a little
x: reflection is recognized

TABLE 1

|  | Component | Name of a material | Refractive index | Particle diameter | Content (part by weight) | Average thickness of an antiglare layer |
|---|---|---|---|---|---|---|
| Example 1 | binder matrix | binder (A) | 1.52 |  | 100 | 4.8 μm |
|  | First particle (A) | Bead (A) | 1.53 | 5.8 μm | 0.5 |  |
|  | Second particle (B) | Bead (B) | 1.59 | 3.5 μm | 0.5 |  |
|  | photopolymerization initiator | photopolymerization initiator (A) |  |  | 5 |  |
|  | Solvent | toluene |  |  | 100.5 |  |
| Example 2 | binder matrix | binder (A) | 1.52 |  | 100 | 5.0 μm |
|  | First particle (A) | Bead (A) | 1.53 | 5.8 μm | 0.5 |  |
|  | Second particle (B) | Bead (B) | 1.59 | 3.5 μm | 10 |  |
|  | photopolymerization initiator | photopolymerization initiator (A) |  |  | 5 |  |
|  | Solvent | Toluene |  |  | 100.5 |  |
| Example 3 | binder matrix | binder (A) | 1.52 |  | 100 | 4.8 μm |
|  | First particle (A) | Bead (A) | 1.53 | 5.8 μm | 2 |  |
|  | Second particle (B) | Bead (B) | 1.59 | 3.5 μm | 0.5 |  |
|  | photopolymerization initiator | photopolymerization initiator (A) |  |  | 5 |  |
|  | Solvent | toluene |  |  | 102 |  |
| Example 4 | binder matrix | binder (A) | 1.52 |  | 100 | 5.0 μm |
|  | First particle (A) | Bead (A) | 1.53 | 5.8 μm | 2 |  |
|  | Second particle (B) | Bead (B) | 1.59 | 3.5 μm | 2 |  |
|  | photopolymerization initiator | photopolymerization initiator (A) |  |  | 5 |  |
|  | Solvent | Toluene |  |  | 102 |  |
| Example 5 | binder matrix | binder (A) | 1.52 |  | 100 | 5.0 μm |
|  | First particle (A) | Bead (A) | 1.53 | 5.8 μm | 10 |  |
|  | Second particle (B) | Bead (B) | 1.59 | 3.5 μm | 2 |  |
|  | photopolymerization initiator | photopolymerization initiator (A) |  |  | 5 |  |
|  | Solvent | toluene |  |  | 110 |  |
| Example 6 | binder matrix | binder (A) | 1.52 |  | 100 | 5.2 μm |
|  | First particle (A) | Bead (A) | 1.53 | 5.8 μm | 10 |  |
|  | Second particle (B) | Bead (B) | 1.59 | 3.5 μm | 10 |  |
|  | photopolymerization initiator | photopolymerization initiator (A) |  |  | 5 |  |
|  | Solvent | toluene |  |  | 110 |  |
| Comparative Example | binder matrix | binder (A) | 1.52 |  | 100 | 4.8 μm |
|  | photopolymerization initiator | photopolymerization initiator (A) |  |  | 5 |  |
|  | Solvent | toluene |  |  | 110 |  |

In the above Table,
binder (A): pentaerythritol acrylate (PE3, manufactured by KYOEISHA CHEMICAL Co., LTD.),
Bead (A): acrylic-styrene bead (XX96P, manufactured by SEKISUI PLASTICS CO., LTD.),
Bead (B): styrene bead (SX-350H, manufactured by Soken Chemical & Engineering Co., Ltd.), and
photopolymerization initiator (A): Irgacure 184 (manufactured by Ciba Specialty Chemicals).

<Evaluation>

Internal haze, surface haze and pencil hardness were measured for the samples obtained in Examples and Comparative Example. The results are shown in Table 2. Also, evaluations of reflection property of external light are shown in Table 2.

Measuring Method of Haze (Internal Haze and Surface Haze)

The haze was measured using a haze meter (NDH2000, NIPPON DENSHOKU) according to JIS K7105. The haze of an antiglare light diffusing member of each sample was determined to be the total haze. And the haze of a sample which a triacetylcellulose sheet was placed on a antiglare film through a two-sided adhesive sheet wherein the triacetylcellulose film was on a surface of an antiglare layer of the antiglare film was measured, and a haze value which hazes (0.2%) of the two-sided adhesive sheet and the triacetylcellulose film were eliminated from the measured haze was determined to be an internal haze. A surface haze was found by eliminating the internal haze from the total haze.

Evaluation Method of Contrast

As for each sample, by using a brightness photometer (TOPCOM-BM7), white luminance and black luminance of an antiglare light diffusing member provided on a display surface at a bright room of 200 lux and a dark room were measured. White luminance is brightness in a case where white is displayed. Black luminance is brightness in a case where black is displayed. White luminance/black luminance is determined to be contrast. About marks is described below.

◎: contrast at a bright room is more than or equal to 150 and contrast at a dark room is more than or equal to 300. (good contrast)

○: contrast at a bright room is not more than or equal to 120 and contrast at a dark room is not more than or equal to 250.

Measuring Method of Pencil Hardness

As for each sample, the pencil hardness was measured according to JIS K5400.

TABLE 2

| | haze | | Reflection Property of External Light (antiglare property) | contrast | pencil hardness |
|---|---|---|---|---|---|
| | Internal haze (%) | Surface haze (%) | | | |
| EXAMPLE 1 | 2 | 1 | ○ | ◎ | 3H |
| EXAMPLE 2 | 30 | 3 | ◎ | ○ | 3H |
| EXAMPLE 3 | 2 | 3 | ◎ | ◎ | 3H |
| EXAMPLE 4 | 5 | 5 | ◎ | ◎ | 3H |
| EXAMPLE 5 | 6 | 10 | ◎ | ○ | 3H |
| EXAMPLE 6 | 33 | 13 | ◎ | ○ | 3H |
| Comparative Example | 1 | 0 | x | ◎ | 2H |

As shown in Example 1-6, by changing contents of first particles (A) and second particles (B), surface haze corresponding to surface diffusion and internal haze corresponding to internal diffusion of an antiglare light diffusing member could be controlled almost independently. Especially, in Example 3 and 4 where content of first particles (A) was 1-4.5 wt % in an antiglare light diffusing layer and content of second particles (B) was 0.5-4.0 wt % in an antiglare light diffusing layer, an antiglare light diffusing member having texture like a clear film, which is superior in contrast and the external light reflection preventiveness and has no surface irregularity, could be obtained.

An antiglare light diffusing member having texture like a clear film without surface irregularity can be obtained by an antiglare light diffusing member of the present invention. In the antiglare light diffusing member, two kinds of particle are used. As for one kind of particle, difference between a refractive index of the particle and a refractive index of a binder matrix is less than or equal to 0.02 and an average particle diameter of the particle is bigger than an average film thickness of an antiglare light diffusing layer. As for another kind of particle, difference between a refractive index of the particle and a refractive index of a binder matrix is 0.03-0.20 and an average particle diameter of the particle is smaller than an average film thickness of an antiglare light diffusing layer. Therefore, in an antiglare light diffusing layer, surface diffusion of incident light and internal diffusion occur effectively.

What is claimed is:

1. An antiglare light diffusing member comprising: a transparent base material; and an antiglare light diffusing layer including a binder matrix, a plurality of first particles (A) and a plurality of second particles (B), wherein a front surface of the layer is irregular; wherein difference between a refractive index of the plurality of first particles (A) and a refractive index of the binder matrix is less than or equal to 0.02 and difference between a refractive index of the plurality of second particles (B) and a refractive index of the binder matrix is 0.03-0.20, wherein an average particle diameter of the plurality of first particles (A) is bigger than an average film thickness of the antiglare light diffusing layer and is smaller than 1.4 times of an average film thickness of the antiglare light diffusing layer, and an average particle diameter of the plurality of particles (B) is smaller than 0.9 times of the average film thickness of the antiglare light diffusing layer and wherein content of the plurality of first particles (A) is 1.0-4.5 wt % in the antiglare light diffusing layer and content of the plurality of second particles (B) is 0.5-4.0 wt % in the antiglare light diffusing layer.

2. The antiglare light diffusing member according to claim 1, wherein a film thickness of the antiglare light diffusing layer is 2-25 μm.

3. The antiglare light diffusing member according to claim 1, wherein standard deviation of particle size of the plurality of first particles (A) is 40% or less of the average particle size of the plurality of first particles (A).

4. The antiglare light diffusing member according to claim 1, wherein standard deviation of particle size of the plurality of second particles (B) is 15% or less of the average particle size of the plurality of second particles (B).

5. The antiglare light diffusing member according to claim 1, wherein the base material is a triacetylcellulose film.

6. The antiglare light diffusing member according to claim 1, wherein the base material is a polarization plate.

7. A transmission type liquid crystal display comprising: the antiglare light diffusing member according to claim 1; a polarization plate; a liquid crystal; a polarization plate; and a backlight unit.

* * * * *